United States Patent [19]

Nowakowsky et al.

[11] Patent Number: 5,304,591
[45] Date of Patent: Apr. 19, 1994

[54] BLENDS OF STYRENE-ACRYLONITRILE POLYMER, STYRENE-METHYL METHACRYLATE-MALEIC ANHYDRIDE TERPOLYMER AND GLASS FILLER

[75] Inventors: Bernhard H. Nowakowsky, Speyer; Rainer Theysohn, Frankenthal; Rainer Bueschl, Roedersheim-Gronau; Klaus Muehlbach, Gruenstadt; Graham E. McKee, Weinheim, all of Fed. Rep. of Germany

[73] Assignee: BASF Aktiengesellschaft, Ludwigshafen, Fed. Rep. of Germany

[21] Appl. No.: 876,166

[22] Filed: Apr. 30, 1992

[30] Foreign Application Priority Data

May 2, 1991 [DE] Fed. Rep. of Germany ....... 4114248

[51] Int. Cl.$^5$ .......................... C08J 5/08; C08K 3/40; C08L 51/06
[52] U.S. Cl. .................... 524/494; 524/504; 525/98; 525/243; 525/314
[58] Field of Search ............... 524/494, 504; 525/243, 525/98, 314

[56] References Cited

U.S. PATENT DOCUMENTS

| | | | |
|---|---|---|---|
| 4,444,951 | 4/1984 | Mendelson | 525/74 |
| 4,839,418 | 6/1989 | Schwaben et al. | 525/53 |
| 4,885,337 | 12/1989 | Eichenauer et al. | 525/75 |
| 4,914,144 | 4/1990 | Muehlbach et al. | 524/139 |
| 5,039,719 | 8/1991 | Watanabe et al. | 523/213 |

FOREIGN PATENT DOCUMENTS

WO91/15543 10/1991 PCT Int'l Appl. .

*Primary Examiner*—Paul R. Michl
*Assistant Examiner*—U. K. Rajguru
*Attorney, Agent, or Firm*—Keil & Weinkauf

[57] ABSTRACT

A thermoplastic molding composition composed of, based on the total of A, B, C and D, 40-95% by weight of a copolymer A of, based on A, 90-95% by weight of styrene and/or its derivatives and 10-50% by weight of acrylonitrile, optionally up to 50% by weight of a graft copolymer B of 20-80% by weight of a monomer mixture of either styrene/acrylonitrile in the ration from 9:1 to 4:6 or styrene/acrylonitrile/methylacrylate in the ration from 19:1:1 to 8:6:6 onto 80-20% by weight of an elastomer based on butadiene or acrylic ester as grafting base, graft copolymerization being effected in either emulsion or solution, 1-50% by weight of a reinforcing glass fiber material C and 0.1-50% by weight of a terpolymer D of styrene, methyl methacrylate and maleic anhydride composed of 1-15% by weight each of styrene and maleic anhydride and a styrene/maleic anhydride ratio of from 5:1 to 1:5, and methyl methacrylate.

4 Claims, No Drawings

BLENDS OF STYRENE-ACRYLONITRILE POLYMER, STYRENE-METHYL METHACRYLATE-MALEIC ANHYDRIDE TERPOLYMER AND GLASS FILLER

As with all glass fiber-reinforced thermoplastics, the object with glass fiber-reinforced styrene copolymers is to produce permanent bonding between the organic polymers and the (inorganic polar) glass surface.

This is achieved in particular by adding an adhesion promoter which has a certain affinity both for the organic synthetic resin and for the glass surface.

EP-Al-303 919 proposes copolymers of styrene, acrylonitrile and maleic anhydride as adhesion promoters. In this case the synthetic resin is a styrene/acrylonitrile (SAN) copolymer.

These adhesion promoters have a disadvantage, however; the corresponding mixtures are difficult to process under conventional conditions, i.e. in particular injection molding.

Adhesion promoters which, according to the invention, are better for glass fiber-reinforced styrene/acrylonitrile copolymers are those based on a copolymer of methyl (meth)acrylate, maleic acid and styrene, i.e. adhesion promoters in which the acrylonitrile in known agents is replaced by, in particular, methyl methacrylate.

The present invention primarily relates to reinforced thermoplastic molding compositions composed of, based on the total of A, B, C and D, A: 40-95% by weight of a copolymer A composed of, in each case based on A, $a_1$: 90-50% by weight of styrene, α-methylstyrene, a nuclear-substituted styrene derivative or mixtures of these monomers and $a_2$: 10-50% by weight of acrylonitrile, B: up to 50% by weight of a graft copolymer B $b_1$: prepared either by emulsion polymerization of, based on B, 20-80% by weight of a monomer mixture based either on $b_{11}$: styrene/acrylonitrile in the ratio from 9:1 to 4:6 or $b_{12}$: styrene/acrylonitrile/methyl methacrylate in the ratio from 19:1:1 to 8:6:6 onto 80-20% by weight of a latex, obtained as emulsion, of an elastomer based on butadiene or acrylic ester as grafting base; or by $b_2$: solution polymerization of 20-80% by weight of a monomer mixture based on $b_{21}$: styrene/acrylonitrile in the ratio from 9:1 to 4:6 or $b_{22}$: styrene/acrylonitrile/methyl methacrylate in the ratio from 19:1:1 to 8:6:6 onto 80-20% by weight of an elastomer, prepared in solution, based on butadiene or acrylic ester as grafting base;

C: 1-50% by weight of a reinforcing agent C based on an inorganic glass and, according to the invention, D: 0.1-50% by weight of a terpolymer D based on styrene/methyl methacrylate/maleic anhydride, with or without other comonomers, with in each case 1-15% by weight of styrene and maleic anhydride and a styrene/maleic anhydride ratio of from 5:1 to 1:5.

The molding compositions according to the invention can also contain up to 20% by weight of conventional additives such as stabilizers, antioxidants, antistatics, flow improvers, release agents, dyes or pigments.

They can also contain up to 20% by weight of a flame retardant from the class of halogenated, preferably brominated, low and high molecular weight compounds such as aryls, aryl ethers, aryl alkyl ethers, arylamines, aryl anhydrides, phenols, arylalkylimides and arylsiloxanes. Additives which are likewise beneficial in many cases are polyesters, e.g. polyethylene terephthalate or polybutylene terephthalate.

The adhesion promoter (terpolymer) D according to the invention is preferably present in the molding compositions in an amount of 1.5-25% by weight, very particularly preferably 3-10% by weight.

Component A

Used as component A in the molding compositions according to the invention are styrene/(meth)acrylonitrile copolymers, styrene/methyl (meth)acrylate copolymers or copolymers of styrene, methyl methacrylate and (meth)acrylonitrile; these are essentially composed of copolymers which contain 10-50% by weight, in particular 20-40% by weight, of (meth)acrylonitrile and/or methyl (meth)acrylate, preferably acrylonitrile and/or methyl methacrylate as monomers $a_2$ and 50-90% by weight, in particular 60-80% by weight, of styrene as monomer $a_1$. The styrene component can, in order to improve the heat resistance, be entirely or partly replaced by α-methylstyrene or nuclear-alkylated styrene, in particular α-methylstyrene. The styrene/acrylonitrile copolymers which are particularly preferably used are commercially available and can be prepared, for example, as described in DE-B 10 01 001 and DE-C 10 03 436. The molecular weight of the copolymer can range from $M_w = 8 \times 10^4$ to $5 \times 10^5$ (weight average $M_w$, e.g. from light scattering).

Component B

Component B takes the form of graft copolymers which are used as required. These graft copolymers are composed of, in each case based on B, 20-80% by weight of a mixture of styrene and acrylonitrile, with or without methyl methacrylate as further copolymer, in the ratio from 9:1 to 4:6 as shell and of an elastomeric grafting base (rubber component) based on a homo- or copolymer of butadiene or acrylic ester.

The preparation of graft copolymers B is known. They can be prepared by polymerization of a mixture of, for example, styrene and acrylonitrile and/or methyl methacrylate in the presence of a rubber.

The rubber should have a glass transition temperature [measured as described by K. H. Illers and H. Breuer, Kolloid-Zeitschrift 137 (1961) 110] which is below 0° C., preferably below −30° C. Examples of suitable rubbers are: polybutadiene (cf. DE-A 14 20 775 and 14 95 089); copolymers of butadiene and styrene (cf. GB-C 649 166); polyacrylates (cf. DE-B 12 60 135) and copolymers of acrylic esters and butadiene (cf. DE-B 12 38 207); also elastomers based on copolymers of acrylic esters with styrene, acrylonitrile and vinyl ethers.

It is possible to use apart from styrene in a conventional manner α-methylstyrene and/or nuclear-alkylated styrenes with up to 12 carbons, as monomeric alkyl (meth)acrylates those with $C_1$-$C_8$-alkyl groups, and methacrylonitrile in place of acrylonitrile or mixtures thereof.

The graft copolymerization can be carried out in a conventional manner in solution, suspension or, preferably, in emulsion. The soft phase of the graft copolymer has, when the rubber is prepared and the grafting is carried out in emulsion, as preferred, a median particle diameter ($d_{50}$ of the cumulative mass distribution) of 0.08 μm. As a rule, after conventional enlargement of the particles, e.g. by agglomeration, the $d_{50}$ is in the range 0.1–0.6 μm. In graft copolymerizations of this type there is at least partial chemical linkage of the polymerizing monomers with the polymerized rubber, this linkage probably taking place at the double bonds present in the rubber. Thus, at least part of the monomers is grafted onto the rubber.

The part of the monomers which is not grafted onto the rubber copolymerizes by itself. For the mixtures of concern here, this copolymer can be assigned to component A. The content of grafted monomers can be established by determining the gel content of the graft copolymers.

The graft copolymer is dissolved in a solvent, eg. in methyl ethyl ketone, when only the ungrafted monomers which have copolymerized with themselves dissolve. This constituent is, when it is present, partly responsible for the impact strength of the molding composition according to the invention.

Component C

The molding composition according to the invention contains conventional reinforcing agents such as glass fibers, glass beads, mineral fibers, alumina fibers, mica, silica flour, wollastonite etc. Glass fiber-reinforced molding compositions are particularly preferred, in which case the glass fibers can be in the form either of chopped strands with an average length of 0.05–0.5 mm or in pellet length (2.0–10 mm).

The glass fibers can be of low or high alkali glass or C glass. They are preferably fitted with a size and an adhesion promoter. Their diameter is generally from 6 to 20 μm, preferably 3 to 6 μm.

Component D

The terpolymer D can be prepared by emulsion polymerization or by continuous copolymerization in solution. Emulsion polymerization is the preferred technique.

Emulsion polymerization is known per se and is described, for example, in

Ullmann's Encyklopädie der technischen Chemie; Volume 19, 4th edition, 1980, pages 132–145;
Encyclopedia of Polymer Science and Engineering
   First Edition, Volume 5, pages 801–859; Second Edition, Volume 6, pages 1–51.

Solids contents of from 5 to 75% by volume, preferably from 10 to 65% by volume, are used. Examples of polymerization initiators used are potassium persulfate, sodium persulfate, organic peroxides and azo compounds.

It is possible to use as emulsifiers anionic, cationic and amphoteric types.

In the continuous copolymerization in solution, the terpolymer is prepared from the monomers $d_1$ methyl methacrylate, $d_2$ styrene (α-methylstyrene) and $d_3$ maleic anhydride at elevated temperatures with vigorous stirring. For this purpose, the monomers $d_1$, $d_2$ and $d_3$ are continuously introduced into a polymerization vessel and, at the same time, an amount of the polymerization mixture corresponding to these amounts is removed from the vessel (cf. A. W. Hanson, R. L. Zimmerman, Industrial Eng. Chemistry 49 (1957) 803). The terpolymer D contains the monomer $d_1$, which is essentially MMA but also other methacrylic esters, in amounts of 98–70%, preferably 95–75%, the monomer $d_2$ styrene or α-methylstyrene in amounts of 1–15%, and the monomer $d_3$ MA in amounts of 1–15%. The $d_2$:$d_3$ ratio can range from 1:5 to 5:1.

The terpolymer has a viscosity number in the range from 30 to 150, preferably from 40 to 120, measured on a 0.5% solution in dimethylformamide at 25° C.

Component E

The molding composition according to the invention can contain as component E additives which are typical and conventional for SAN polymers and graft copolymers based on ABS, ASA etc. or mixtures thereof. Examples of such additives are: fillers and materials to increase the screening from electromagnetic waves (eg. metal flakes, powders, fibers, metal-coated fillers), dyes, pigments, antistatics, antioxidants, stabilizers, also flame retardants and, in particular, the lubricants necessary for further processing of the molding composition, eg. in the production of moldings. Particularly suitable lubricants are those based on N,N'-distearylethylenediamine (acra wax), which are preferably used to maintain the processing properties of the molding compositions at a high level. These are, suprisingly, more suitable than silicone oils, Pluriols and the stearates.

Component F

The flame retardants can be in the widest sense halogen-, preferably bromine-, containing low and high molecular weight (aromatic) compounds selected from the classes of aryls, aryl ethers, aryl alkyl ethers, arylamines, arylamides, aryl anhydrides, phenols, arylalkylimides and arylsiloxanes. The following list shows characteristic examples but implies no restriction:

Aryls:
Hexabromobenzene, brominated oligomeric styrene (BOS), pentabromomethylbenzene;
Aryl ethers:
Decabromodiphenyl ether, octabromodiphenyl ether, poly(2,6-dibromo-1,4-phenylene) ether;
Aryl alkyl ethers:
Bis(2,4,6-tribromophenoxy)ethane, bis(pentabromophenoxy)ethane, poly(tetrabromobisphenol A glycidyl ether), poly(tetrabromohydroquinone-1,2-ethylidene) ether;
Arylamines:
Tris(2,4-dibromophenyl)amine, bis(pentabromophenyl)amine, tribromoaniline;
Aryl anhydrides:
Tetrabromophthalic anhydride;
Arylimides:
Tetrabromophthalimide;
Arylalkylimides:
Ethylene-bis(tetrabromophthalimide);
Phenols:
Tetrabromobisphenol A;
Arylsiloxanes:
Tetrakis(2,4,6-tribromophenyl)siloxane.

The halogen-containing flame retardants are preferably employed together with synergists such as antimony, bismuth and phosphorus compounds.

The following are preferably employed: Octabromodiphenyl ether, DE 79 from Great Lakes, poly(2,6-dibromo-1,4-phenylene) ether, PO 64 P from Great Lakes, poly(tetrabromobisphenol A glycidyl ether), F 2400 from Makhteshim, ethylenebis(tetrabromophthalimide), Saytex BT 93 from Saytech and bis(2,4,6-tribromophenoxy)ethane, Firemaster FF 680 from Great Lakes.

Particularly preferably used are poly- and oligo(tetrabromobisphenol A) carbonate, BC 52 from Great Lakes and poly(tetrabromobisphenol A glycidyl ether), F 2400 from Makhteshim.

These flame retardants are added in amounts of 1-20% by weight to the molding compositions according to the invention.

Component G

The molding composition according to the invention can contain, for further improvement of the properties or of the processing, as component G a polyester, eg. polyethylene terephthalate or polybutylene terephthalate, in amounts of up to 20% by weight.

Preparation of the molding composition

Components A, B, C and D, with or without E, F and G, can be mixed by all conventional methods. However, components A, B, C and D, with or without E, F and G, are preferably mixed at 200°–300° C. by extruding, kneading or rolling the components together, the components having been, if necessary, previously isolated from the solution obtained in the polymerization or from the aqueous dispersion. The products of the graft copolymerization (component $b_{11}$) obtained in aqueous dispersion can, however, also have part of the water removed or be directly mixed as dispersion when drying component $b_{11}$ to give $b_1$ or additionally together with $b_2$ to give B. In this case the graft copolymers $b_{11}$ are completely dried during the mixing. Subsequently $b_1$ is mixed with $b_2$ and the polycarbonate or B is mixed with the polycarbonate. However, it is also possible to mix component $b_{11}$, from which part of the water has been removed, or its dispersion directly with $b_{12}$, $b_2$, the polycarbonate A and the component C, in which case $b_{11}$ is completely dried during the mixing.

It may be advantageous for individual components to be mixed beforehand. It is also possible to mix the components in solution and to remove the solvent. Use The molding composition according to the invention can be processed in conventional ways, e.g. by extrusion, injection molding, calendering, blow molding, compression molding or sintering. The molding compositions prepared by the process according to the invention are particularly preferably used to produce injection moldings for automobile construction.

Use for casing of electrical equipment, domestic appliances, telephones, for sheets, pipes and in automobile construction.

Tests

The properties mentioned in the following examples are determined as follows:

The notched impact strength $a_k$ and the impact strength $a_n$ were measured by the DIN 53 453 method at 23° C. and −40° C. on small standard specimens injection molded at 260° C.

The bending stress at maximum force $\sigma_{bB}$ [N/mm²] was determined by the DIN 53 352 method.

The ultimate tensile strength $\sigma_R$ [N/mm²] was determined by the DIN 53 455 method.

The modulus of elasticity $E_z$ (N/mm²) was determined in a tensile test by the DIN 53 457 method.

The viscosity number of polybutylene terephthalate was determined by the DIN 53 728, part III, method in phenol/o-dichlorobenzene (1:1).

The melt volume index (MVI) was determined at 220° C. under a load of 10 kg by the DIN 53 735 method.

Component A $a_1$ SAN copolymer 35% AN, 65% styrene, VN=80 ml/g $a_2$ SAN copolymer 30% AN, 70% methylstyrene, VN=60 ml/g

Component B $b_1$ E rubber component 70% polybutadiene, 8% AN, 22% styrene $b_2$ S rubber component 75% poly(butyl acrylate), 7% AN, 18% styrene

Component C

Low alkali glass fibers, chopped 4.5 mm
Fiber diameter 10 μm
Product OCF 429

Component D $d_1$ MMA-S-MA terpolymer 75% MMA, 12% styrene, 13% MA $d_2$ MMA-S-MA terpolymer 80% MMA, 10% styrene, 10% MA $d_3$ MMA-S-MA terpolymer 85% MMA, 8% styrene, 7% MA For comparison, a terpolymer of styrene, acrylonitrile and maleic anhydride in the ratio 65:27.5:7.5 (by weight) was used ($D_c$).

Component F

F poly(tetrabromobisphenol A glycidyl ether)

Component G

G polybutylene terephthalate, VN=130 ml/g

| Example | Composition [parts by weight] | $a_k$ [kJ/m²] | $a_n$ [kJ/m²] | $\sigma_{bB}$ [N/mm²] | $\sigma_R$ [N/mm²] | $\epsilon_R$ [%] | $E_z$ [N/mm²] | MVI [ml/g] |
|---|---|---|---|---|---|---|---|---|
| 1 | 60 $A_1$ 15 $B_1$ 15 C 10 $D_1$ | 6.5 | 24 | 142 | 102 | 2.8 | 6631 | 3.6 |
| 2 | 62 $A_2$ 19 $B_2$ 15 D 4 $D_1$ | 7 | 25 | 142 | 104 | 2.7 | 6677 | 2.4 |
| 3 | 60 $A_2$ 19 $B_2$ 15 C | 8 | 26 | 153 | 107 | 3.0 | 6652 | 2.3 |

-continued

Examples

| Example | Composition [parts by weight] | $a_k$ [kJ/m$^2$] | $a_n$ [kJ/m$^2$] | $\sigma_{bB}$ [N/mm$^2$] | $\sigma_R$ [N/mm$^2$] | $\epsilon_R$ [%] | $E_Z$ [N/mm$^2$] | MVI [ml/g] |
|---|---|---|---|---|---|---|---|---|
| 4 | 6 D$_1$<br>60 A$_2$<br>19 B$_2$<br>15 C | 7.5 | 27 | 150 | 105 | 2.9 | 6654 | 2.6 |
| 5 | 6 D$_2$<br>55 A$_1$<br>24 B$_1$<br>15 C | 9 | 29 | 135 | 99 | 3.3 | 5978 | 2.2 |
| 6 | 6 D$_1$<br>60 A$_1$<br>19 B$_1$<br>15 C | 7.5 | 25 | 140 | 101 | 2.5 | 6611 | 2.7 |
| 7 | 4 D$_3$<br>61 A$_1$<br>35 C | 6 | 21 | 220 | 154 | 1.8 | 11,712 | 3.6 |
| 8 | 4 D$_2$<br>59 A$_1$<br>35 C | 5 | 18 | 201 | 149 | 1.8 | 11,648 | 2.5 |
| 9 | 6 D$_2$<br>55 A$_1$<br>17 B$_1$<br>14 C | 7 | 22 | 135 | 82 | 2.6 | 5570 | 3.1 |
| 10 | 6 D$_2$<br>8 F<br>57 A$_1$<br>18 B$_1$<br>14 C<br>6 D$_2$<br>5 G | 8 | 27 | 149 | 104 | 2.7 | 6610 | 4.9 |

Comparative tests

| Comp. test | Composition [parts by weight] | $a_k$ [kJ/m$^2$] | $a_n$ [kJ/m$^2$] | $\sigma_{bB}$ [N/mm$^2$] | $\sigma_R$ [N/mm$^2$] | $\epsilon_R$ [%] | $E_Z$ [N/mm$^2$] | MVI [ml/g] |
|---|---|---|---|---|---|---|---|---|
| I | 66 A$_1$<br>19 B$_2$<br>15 C | 4 | 22 | 112 | 76 | 1.6 | 6659 | 3.8 |
| II | 66 A$_2$<br>19 B$_2$<br>15 C | 4.5 | 12 | 117 | 78 | 1.8 | 6668 | 1.8 |
| III | 65 A$_1$<br>35 C | 4 | 11 | 164 | 124 | 1.3 | 11,950 | 1.7 |
| IV | 65 A$_2$<br>35 C | 4 | 12 | 172 | 127 | 1.3 | 12,150 | 1.4 |
| V | 60 A$_1$<br>15 B$_1$<br>15 C<br>10 D$_c$ | 5 | 18 | 155 | 101 | 1.9 | 6654 | 1.6 |
| VI | 60 A$_1$<br>19 B$_1$<br>15 C<br>6 D$_c$ | 6 | 20 | 142 | 100 | 2.1 | 6620 | 1.2 |
| VII | 55 A$_1$<br>24 B$_1$<br>15 C<br>6 D$_c$ | 6.5 | 21 | 138 | 97 | 2.3 | 5789 | 0.9 |

We claim:
1. A thermoplastic molding composition consisting essentially of, based on the total of A, B, C and D,
   A: 40-95% by weight of a copolymer A composed of, in each case based on A,
   a$_1$: 90-50% by weight of styrene, α-methylstyrene, a nuclear-substituted styrene derivative or mixtures of these monomers and
   a$_2$: 10-50% by weight of acrylonitrile,
   B: up to 50% by weight of a graft copolymer B
   b$_1$: prepared either by emulsion polymerization of, based on B, 20-80% by weight of a monomer mixture based either on
   b$_{11}$: styrene/acrylonitrile in the ratio from 9:1 to 4:6 or
   b$_{12}$: styrene/acrylonitrile/methyl methacrylate in the ratio from 19:1:1 to 8:6:6 onto 80-20% by weight of a latex, obtained as emulsion, of an elastomer based on butadiene or acrylic ester as grafting base; or by
   b$_2$: solution polymerization of 20-80% by weight of a monomer mixture based on either
   b$_{21}$: styrene/acrylonitrile in the ratio from 9:1 to 4:6 or
   b$_{22}$: styrene/acrylonitrile/methyl methacrylate in the ratio from 19:1:1 to 8:6:6 onto 80-20% by weight of an elastomer, prepared in solution, based on butadiene or acrylic ester as grafting base;

C: 1-50% by weight of a reinforcing agent C based on an inorganic glass and

D: 0.1-50% by weight of a terpolymer D based on styrene/methyl methacrylate/maleic anhydride, with or without other comonomers, with in each case 1-15% by weight of styrene and maleic anhydride and a styrene/maleic anhydride ratio of from 5:1 to 1:5.

2. A molding composition as claimed in claim 1, containing terpolymer D in an amount of 1.5-25% by weight.

3. A molding composition as claimed in claim 1, containing up to 20% by weight of conventional additives such as stabilizers, antioxidants, antistatics, flow improvers, release agents, dyes or pigments.

4. A molding composition as claimed in claim 1, containing up to 20% by weight of a flame retardant.

* * * * *